US005767483A

United States Patent [19]

Cameron et al.

[11] Patent Number: 5,767,483

[45] Date of Patent: Jun. 16, 1998

[54] METHOD OF LASER MARKING A BODY OF MATERIAL HAVING A THERMAL CONDUCTIVITY APPROXIMATELY EQUAL TO THAT OF GLASS

[75] Inventors: Allan Cameron, Dalkeith, Scotland; Mary Violet Stockdale, Kettering, United Kingdom; Robert Marc Clement, Pontardawe; Neville Richard Ledger, Morriston, both of Wales; Christopher Edward Jeffree, Pathead, Scotland

[73] Assignee: United Distillers PLC, United Kingdom

[21] Appl. No.: 602,734

[22] PCT Filed: Aug. 19, 1994

[86] PCT No.: PCT/GB94/01819

§ 371 Date: Jul. 1, 1996

§ 102(e) Date: Jul. 1, 1996

[87] PCT Pub. No.: WO95/05286

PCT Pub. Date: Feb. 23, 1995

[30] Foreign Application Priority Data

Aug. 19, 1993 [GB] United Kingdom .................. 9317270

[51] Int. Cl.$^6$ .................................. B23K 26/00

[52] U.S. Cl. .................. 219/121.85; 347/225; 264/482

[58] Field of Search .................. 219/121.6, 121.68, 219/121.69, 121.78, 121.8, 121.85; 347/224, 225, 260; 250/492.1; 204/157.41, 157.44; 264/482

[56] References Cited

U.S. PATENT DOCUMENTS

| | | | |
|---|---|---|---|
| 3,657,085 | 4/1972 | Hoffmeister et al. | 204/157.41 |
| 3,715,734 | 2/1973 | Fajans | 365/127 |
| 4,092,518 | 5/1978 | Merard | 219/121.69 |
| 4,744,647 | 5/1988 | Meshel et al. | 219/121.85 |
| 4,822,973 | 4/1989 | Fahner et al. | 219/121.6 |
| 4,990,792 | 2/1991 | Frei | 250/566 |
| 5,206,496 | 4/1993 | Clement et al. | 219/121.6 |
| 5,575,936 | 11/1996 | Goldfarb | 219/121.68 |

FOREIGN PATENT DOCUMENTS

| | | | |
|---|---|---|---|
| 4-110944 | 4/1992 | Japan | 219/121.85 |
| 92/03297 | 3/1992 | WIPO | 219/121.85 |
| 92/12820 | 8/1992 | WIPO | 219/121.85 |

*Primary Examiner*—Teresa J. Walberg
*Assistant Examiner*—Gregory L. Mills
*Attorney, Agent, or Firm*—Antonelli, Terry, Stout, & Kraus, LLP

[57] ABSTRACT

A method of providing a body of material (14), having a thermal conductivity approximately equal to that of glass, with a sub-surface mark. A beam of laser radiation (12) to which the material (14) is substantially opaque is directed to surface of the body, so as to cause beam energy to be absorbed at the surface of the material in an amount sufficient to produce localised stresses within the body (14) at a location spaced from the surface without any detectable change at the surface, the localised stresses thus produced being normally invisible to the naked eye but capable of being rendered visible under polarised light.

15 Claims, 3 Drawing Sheets

METHOD OF LASER MARKING A BODY OF MATERIAL HAVING A THERMAL CONDUCTIVITY APPROXIMATELY EQUAL TO THAT OF GLASS

BACKGROUND OF THE INVENTION

The present invention relates to a method of providing a body of material with a sub-surface mark that is invisible to the naked eye but which is capable of being rendered visible under polarized light.

Many products are packaged in containers of glass or plastics and there has been a desire for many years to provide a method of marking containers of this type so that once a mark has been applied, it cannot be removed. Clearly such a method of marking would have a wide range of applications, not least in combating parallel trading.

In the past, in order to produce an indelible mark, manufacturers have relied, almost exclusively, on surface marking. However, the problem with this type of mark is that it may be either destroyed by removing that part of the surface on which the mark is applied, or imitated by the application of an identical mark on a substitute container.

In order to overcome these problems, the Applicant developed a method and apparatus for providing a body of material with a sub-surface mark which are described in International Patent Publication No. WO 92/03297. The method described comprises the steps of directing, at a surface of the body, a high energy density beam to which the material is transparent and bringing the beam to a focus at a location spaced from the surface and within the body so as to cause localised ionization of the material and the creation of a mark in the form of an area of increased opacity to electromagnetic radiation substantially without any detectable change at the surface. This provided the advantage that the resulting mark was both difficult to imitate and near impossible to remove.

In order to provide a method of marking having further advantages, it can be desirable that the resulting mark is invisible to the naked eye. In this way, a potential counterfeiter will not only have difficulty in removing or imitating the mark, but will also run into problems in locating the mark in the first place.

U.S. Pat. No. 3,657,085 describes a method of proving a sub-surface mark using an electron beam but also mentions the possibility of using a laser beam as an alternative. The object of the U.S. patent is to provide a method of marking an article, such as a spectacle lens, with an identification mark which is normally invisible but which can be rendered visible when required. To this end, the electron, or laser beam, is directed onto a mask placed over the spectacle lens so that that part of the beam passing through the cut-out portions of the mask, impinges upon the material of the spectacle lens. The beam is scattered by collisions with the molecules of the material that makes up the lens with the result that the kinetic energy of the beam is absorbed as heat producing permanent stress patterns within the lens. These stress patterns are invisible to the naked eye but may be rendered visible by double refraction in polarized light.

When referring to the possible use of a laser beam, U.S. Pat. No. 3,657,085 does so in conjunction with the marking of mass coloured materials, i.e. materials having a chromophore throughout their bulk and not simply ones provided with a coloured surface layer. It is this chromophore that absorbs the laser radiation and, in doing so, generates sufficient localised heating to produce permanent stress patterns within the material. Since the resulting mark is spaced from the surface of the material, the material must be at least partially transparent to the laser radiation used in order to allow the laser radiation to penetrate the material to the required depth.

SUMMARY OF THE INVENTION

In contrast, according to a first aspect of the present invention, there is provided a method of providing a body of material with a sub-surface mark comprising the steps of directing at a surface of the body a beam of laser radiation to which the material is substantially opaque, the beam energy absorbed at the surface of the material being sufficient to produce localised stresses within the body at a location spaced from said surface without any detectable change at said surface, the localised stresses thus produced being normally invisible to the naked eye but capable of being rendered visible under polarized light.

Advantageously the mark created by the localised stresses may be representative of one or more numerals, letters or symbols or a combination thereof.

Advantageously the beam of laser radiation may be concentrated so as to form an illuminated spot at a location on the surface of the body, the spot being movable relative to the body to be marked, thereby enabling the mark created by the localised stresses to be of a predetermined shape. Preferably the spot may be moved relative to the body to be marked in such a way as to produce an elongate region of localised stresses that when rendered visible under polarised light gives the appearance of a line. Alternatively, the spot may be moved relative to the body to be marked in such a way as to produce a series of spaced apart regions of localised stresses that when rendered visible under polarised light gives the appearance of a series of dots. In particular, the series of spaced apart regions of localised stresses may be formed by moving the spot at a constant speed relative to the body to be marked and periodically varying the power density of the beam. Alternatively, the series of spaced apart regions of localised stresses may be formed by maintaining the power density of the beam substantially constant and varying the time the spot is used to illuminate successive locations on the surface. To this end the spot may be moved relative to the body to be marked at a speed that varies periodically between zero and 3000 mm/s whilst still maintaining an average speed in the range from 2 to 3 m/s. Preferably the beam energy absorbed at successive locations on the surface may vary smoothly from one location to the next. Preferably the laser radiation may have a power density at the spot of up to 10 $kW/cm^2$.

Advantageously the beam of laser radiation may be caused to illuminate a mask placed in front of the body to be marked, the mask having one or more apertures, thereby enabling the mark created by the localised stresses to be of a predetermined shape.

Advantageously the beam of laser radiation may be generated by a $CO_2$ laser.

Advantageously the body of material may be transparent to electromagnetic radiation at wavelengths within the visible region. Alternatively, the body of material may be opaque to electromagnetic radiation at wavelengths within the visible region such that the localised stresses may only be seen by optical instruments operating at an appropriate wavelength within the electromagnetic spectrum.

According to a second aspect of the present invention there is provided a body of material comprising a region of localised stresses at a location spaced from a surface of the body and without any detectable change at said surface, the localised stresses extending from one edge of a lens-shaped mark of substantially convex cross-section.

Advantageously the body of material may be transparent to electromagnetic radiation at wavelengths within the visible region. In particular, the body of material may be of glass or plastics. Alternatively, the body of material may be opaque to electromagnetic radiation at wavelengths within the visible region such that the localised stresses may only be seen by optical instruments operating at an appropriate wavelength within the electromagnetic spectrum.

Advantageously the mark created by the localised stresses may be representative of one or more numerals, letters or symbols or a combination thereof.

Advantageously the body of material may be a container.

BRIEF DESCRIPTION OF THE DRAWINGS

A number of embodiments of the present invention will now be described by way of example with reference to the accompanying drawings in which.

DETAILED DESCRIPTION OF A PREFERRED EMBODIMENT OF THE INVENTION

Figure 1:
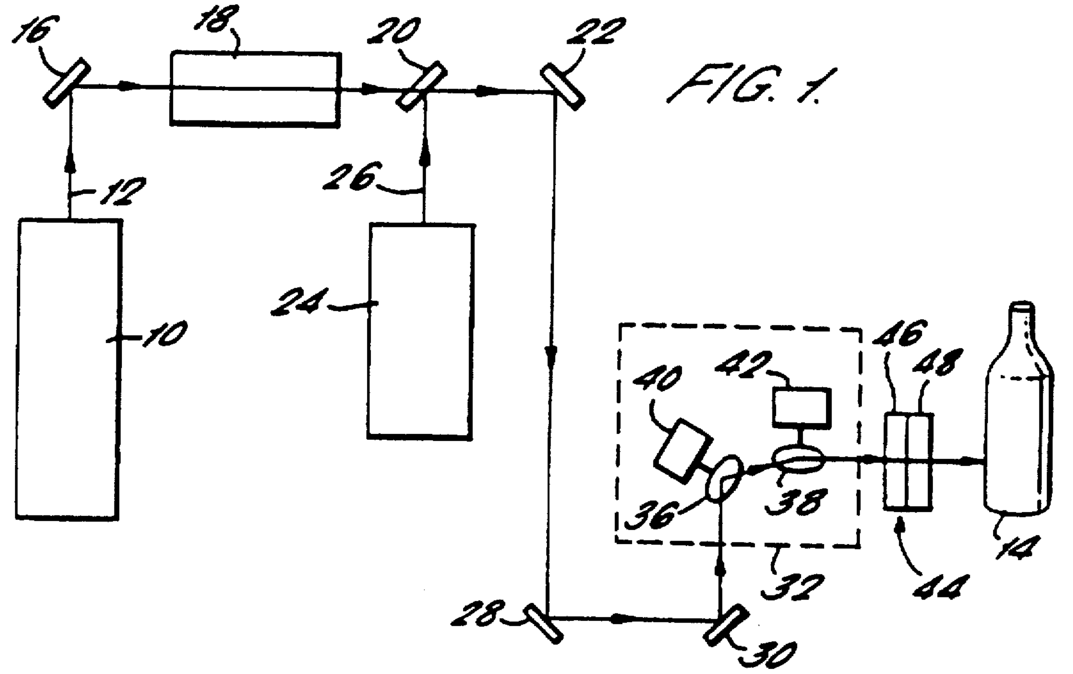
FIG. 1 is a schematic diagram of an apparatus capable of performing the method to be described.

An apparatus capable of performing the method of marking of the present invention is shown in FIG. 1. As can be seen, this apparatus comprises a source 10 which produces a beam of laser radiation 12 which is directed so as to impinge upon a body of material 14 that, in the present example, is in the form of a bottle. Since the eventual sub-surface mark is intended to be normally invisible to the naked eye but capable of being rendered visible to the eye under polarized light, the bottle 14 is chosen to be of a material such as glass or plastics that is transparent to electromagnetic radiation within the visible region of the electromagnetic spectrum. Furthermore, the source 10 is selected in such a way that the material of the bottle 14 is substantially opaque to the beam of laser radiation 12 produced by the source.

In the particular embodiment illustrated in FIG. 1, the source 10 comprises an RF excited simulated continuous-wave carbon dioxide ($CO_2$) laser that emits a beam of laser radiation 12 having a wavelength of 10.6 μm and which is consequently invisible to the naked eye. Having been emitted from the $CO_2$ laser, the beam of laser radiation 12 is incident upon a first reflecting surface 16 that directs the beam 12 through a beam expander 18 and a beam combiner 20 to a second reflecting surface 22. A second source of laser radiation, in the form of a low power He-Ne (Helium-Neon) laser 24, is disposed adjacent to the $CO_2$ laser 10 and emits a secondary beam of visible laser radiation 26 with a wavelength of 632.9 nm. The secondary beam 26 impinges upon the beam combiner 20 where it is reflected towards the second reflecting surface 22 coincident with the beam of laser radiation 12 from the $CO_2$ laser 10. Thus the necessary properties of the beam combiner 20 are that it should transmit electromagnetic radiation with a wavelength of 10.6 μm whilst reflecting electromagnetic radiation with a wavelength of 632.9 nm. In this way the He-Ne laser beam 26 provides the combined $CO_2$/He-Ne beam 12,26 with a visible component that facilitates optical alignment.

Once combined, the two coincident beams 12,26 are reflected at the second reflecting surface 22 to a third reflecting surface 28, and from the third reflecting surface 28 are further reflected towards a fourth reflecting surface 30. From the fourth reflecting surface 30 the combined beam 12,26 is reflected yet again toward a head unit 32 from whence the combined beam 12,26 is finally directed towards the bottle 14. In order to facilitate marking at different heights from the base of the bottle 14, the third and fourth reflecting surfaces 28 and 30 are integrally mounted, together with the head unit 32, so as to be adjustable in a vertical plane under the action of a stepping motor (not shown).

Within the head unit 32 the combined $CO_2$/He-Ne beam 12,26 is sequentially incident upon two movable mirrors 36 and 38. The first of the two mirrors 36 is disposed so as to be inclined to the combined beam 12,26 that is incident upon it as a result of reflection from the fourth reflecting surface 30 and is movable in such a way as to cause the beam reflected therefrom to move in a vertical plane. The second of the two mirrors 38 is similarly inclined, this time to the beam 12,26 that is incident upon it as a result of reflection from the first mirror 36, and is movable in such a way as to cause the reflected beam 12,26 to move in a horizontal plane. Consequently, it will be apparent to those skilled in the art that the beam 12,26 emerging from the head unit 32 may be moved in any desired direction by the simultaneous movement of the first and second mirrors 36 and 38. In order to facilitate this movement the two movable mirrors 36 and 38 are mounted on respective first and second galvanometers 40 and 42. Whilst it is recognised that any suitable means may be provided to control the movement of the two mirrors 36 and 38, the approach adopted combines a speed of response with an ease of control that represents a significant advantage over alternative control means.

Emerging from the head unit 32, the combined beam 12,26 is concentrated by passing through a lens assembly 44 which may include one or more lens elements. A first lens element 46 brings the beam 12,26 to a focus at a chosen location on the surface of the bottle 14. As is well known, the maximum power density of the beam 12,26 is inversely proportional to the square of the radius of the beam 12,26 at its focus which in turn is inversely porportional to the radius of the beam 12,26 that is incident upon the focusing lens 46. Thus for a beam 12,26 of electromagnetic radiation having a wavelength λ and a radius R incident upon a lens of focal length f, the power density at the focus E, is to a first approximation, given by the expression:

$$E = \frac{PR^2}{\lambda^2 f^2}\ W/m^2$$

where P is the power produced by the laser. From this expression the value and purpose of the beam expander 18 is readily apparent since increasing the radius of the beam R serves to increase the power density E at the focus. In addition, the lens element 46 is typically a short focal length lens having a focal length in the range between 70 mm and 80 mm so that power densities in excess of 6 kW/cm$^2$ may be readily achieved at the focus of the beam 12,26.

A second lens element 48 may be placed in series with the focusing lens element 46 in order to compensate for any curvature of the surface of the bottle 14. It will be recognised that such a correcting lens will not be required if the body to be marked 14 presents a substantially planar surface to the incident beam and the need for such an element may be negated altogether if the first element 46 is of variable focal length and comprises, for example, a flat field lens. However, it is to be noted that the use of one or more optical elements is a particularly simple and elegant way of ensuring that the beam 12,26 is focused on the surface of the body 14 irrespective of any curvature thereof.

Figure 2:
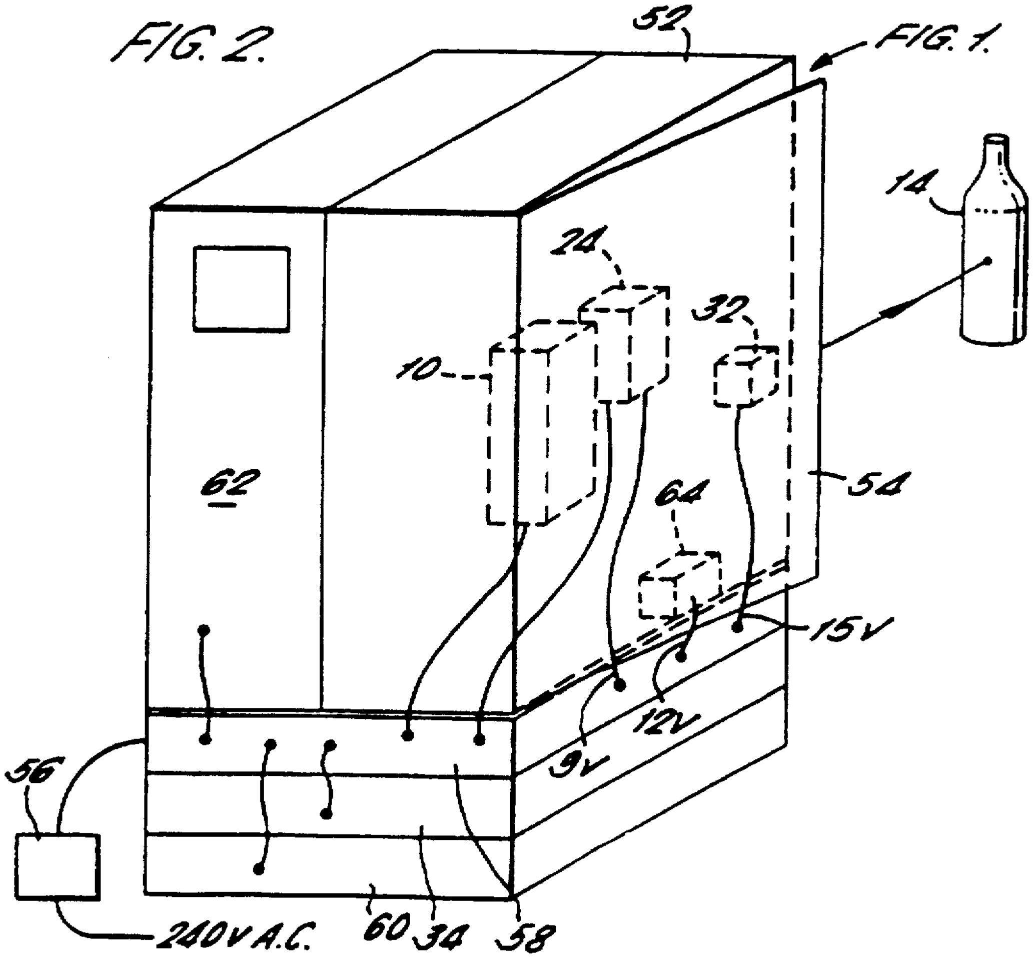
FIG. 2 is a schematic diagram of the way in which electrical power is distributed throughout the apparatus of FIG. 1.

In the interests of safety, the two lasers 10 and 24 and their respective beams 12 and 26 are enclosed within a safety chamber 52 as shown in FIG. 2, with the combined beam 12,26 emerging from the safety chamber 52 only after passing through the lens assembly 44. Access to the two lasers 10 and 24 and the various optical elements disposed in the path of the respective beams 12,26 is gained by means of a door panel 54 which is fitted with an interlock 56 which prevents the operation of the $CO_2$ laser 10 and the He-Ne laser 24 while the door panel 54 is open.

A single phase electrical mains supply of 240 v is fed via the door panel interlock 56 to a mains distribution unit 58 that is disposed below, and isolated from, the safety chamber 52 in order to prevent any electrical effects from interfering with the operation of the lasers 10 and 24. From the distribution unit 58, mains electrical power is provided to the $CO_2$ laser 10 and the He-Ne laser 24, as well as to a chiller unit 60 that serves to cool the $CO_2$ laser 10. In addition mains electrical power is also supplied to the stepping motor 34 and to a computer 62. Three AC/DC convertors and associated voltage regulators provide regulated DC voltage supplies of 12 v, ±10 v and ±28 v that are fed respectively to the He-Ne laser 24 to facilitate the pumping mechanism and to the head unit 32 where in particular, the ±28 v supply is used to power the first and second galvanometers 40 and 42 and the ±10 v supply is fed to the galvanometers to produce a predetermined movement of the first and second mirrors 36 and 38. Thus by using the computer 62 to modulate the ±10 v supply the various movements of the first and second galvanometer mirrors 36 and 38 may be made under the control of a computer programme.

In use, the beam of laser radiation 12 emited by the $CO_2$ laser 10 is caused to form an illuminated spot at a location on the surface of the bottle 14, the body to be marked. This spot may then be scanned across the surface of the bottle as a result of the movement of one or both of the galvanometer mirrors 36 and 38.

It is well known that glass and some other materials that are transparent to electromagnetic radiation within the visible region of the electromagnetic spectrum are opaque to electromagnetic radiation having a wavelength of 10.6 µm and that a $CO_2$ laser produces laser radiation having just this wavelength. Despite this the Applicant has established that it is possible to provide a transparent body, such as glass, with a sub-surface mark using a $CO_2$ laser.

To understand the marking process it is important to remember that the absorbtion of a beam of laser radiation by a material is a progressive or statistical process and that the beam energy is always absorbed in a Beam Interaction Volume (BIV) of finite dimensions. Thus in this context a Beam Interaction Volume may be defined as that volume within which an arbitrarily large proportion, say 95%, of the incident beam energy is absorbed. For electromagnetic radiation within the visible region of the electromagnetic spectrum and a body of glass which is transparent at those wavelengths, the BIV may be very large compared to the dimensions of the body concerned. By contrast, for electromagnetic radiation having a wavelength of 10.6 µm, experiments have shown the same body of glass to have a BIV having a depth in the direction of propagation of the beam of between 8.0 µm and 16.0 µm for a beam having a power density within the range from 6 to 10 kW/cm$^2$. Thus, whilst for most practical purposes the beam of laser radiation 12 may be thought of as being absorbed "at the surface" of the body to be marked 14, the fact that a dimension of even 8.0 µm is readily observed using electron microscopical techniques means that it is necessary to further define what is to be understood by the term opaque. Thus, for the avoidance of doubt, in the present context the term opaque, when used to describe the material to be marked, refers to a material capable of absorbing 95% of the energy of an incident beam of laser radiation within a distance which is less than that at which the sub-surface mark is spaced from the surface.

Despite 95% of the energy of the laser radiation being absorbed within the BIV, the effect of the beam on the body to be marked is not confined to this surface region. For example, the heating effect produced by the beam may be felt at a location outside the BIV since glass has a significant coefficient of thermal conductivity. Likewise, any resulting stress pattern may also extend beyond the region of the glass that is directly affected by the laser beam, in just the same way that the stress pattern in a pane of glass extends beyond the tip of a crack that is propagated therein. Thus it will be appreciated that in principle, the physical consequences of irradiation can be observed at a location remote from the BIV.

Figure 3:
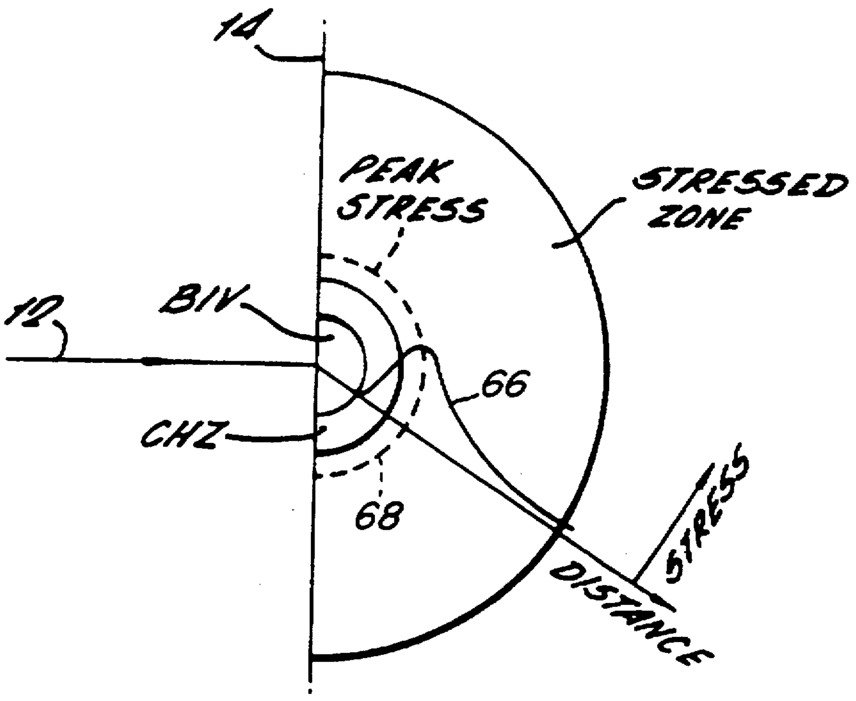
FIG. 3 is a schematic diagram illustrating the way in which a beam of laser radiation interacts with a body of material.

This situation is summarised in FIG. 3 in which there is illustrated a body of material having a BIV in which an arbitrary proportion of an incident beam energy is lost to the material. Surrounding the BIV is a Conductive Heating Zone (CHZ) whose boundary, like that of the BIV, must again be defined in terms of arbitrary limits. Beyond the Conductive Heating Zone lies a stressed zone in which the stresses result from thermally-induced changes in the physical dimensions of the material in the BIV and in all or part of the CHZ. The variation in magnitude of these stresses as a function of the radial distance from the incident beam is indicated by means of the curve 66 from which it can be seen that a line of peak stress 68 may be drawn a short distance from the boundary of both the BIV and the CHZ.

It has been found that using a $CO_2$ laser having a power density of between 6 kW/cm$^2$ and 10 kW/cm$^2$ it is possible to create a mark within a body of glass at a depth of between 40 µm and 50 µm beyond that to which the laser radiation penetrates. This mark, which in cross-section has the shape of a convex lens element, typically has a depth (i.e. a dimension in the direction of the beam) of 10.8 µm and a diameter of 125 µm and is thought to be caused as a result of a thermal interaction within the glass.

In this context it is to be be noted that the possible types of interaction between laser radiation and a body of material may be categorised under three headings dependant upon the power density of the laser radiation concerned. In order of increasing power density these headings are as follows:

1. Photochemical interactions including photoinduction and photoactivation.
2. Thermal interactions in which the incident radiation is absorbed as heat; and 3. Ionising interactions which involve the non-thermal photodecomposition of the irradiated material.

The difference between the thresholds of these three interactions is clearly demonstrated by comparing the typical power density of $10^{-3}$ W/cm$^2$ required to produce a photochemical interaction with the power density of $10^{12}$W/cm$^2$ typical of ionising interactions such as photoablation and photodisruption.

The lens-shaped mark, which is invisible to the naked eye but which can be viewed using a compound microscope under both bright field illumination and when viewed between crossed polarizing filters, has been observed to have a sharply-defined lower edge. This observation has led to the speculation that the mark represents the boundary between those atoms within the glass that derive sufficient energy from the incident beam to overcome the bonds with which they are tied to their neighbours and those that do not. As might be expected from this model, a stressed region extends beyond the lower edge of the lens-shaped mark and into the body of the glass. This stressed region, which may have a dimension in the direction of the beam of up to 60 µm, is also invisible to the naked eye but may be rendered visible under polarized light.

It has been found that the lens-shaped mark and the associated stressed region may only be created using a $CO_2$ laser beam having an energy density falling within a narrowly defined range. If the energy absorbed by the glass is too small then an insufficient thermal gradient is established to give rise to an observable stressed region. Conversly, if too high an energy is absorbed, the surface of the glass may melt or else the glass may crack along a line of peak stress and flake off. This cracking of the glass, known as "breakout", not only relieves the stress in what remains of the glass but also renders the mark both visible to the naked eye and prone to detection by surface analysis.

In the embodiment described, the beam of laser radiation 12 is scanned across the surface of the bottle 14 at an average speed of 2 to 3 m/s to produce patterns which may be used to relate to alpha-numeric characters. However, rather than moving at a constant speed from one end of a straight line scan to the other, the beam is scanned in a series of incremental steps which serve to increase the definition and resolution of the characters thus produced. As a result, the velocity of the beam varies in a manner which is approximately sinusoidal between zero when the beam is at either end of one of its incremental steps, and so is effectively at rest, and approximately 3 m/s at a point midway between these two ends. Consequently, even though the power density of the beam is kept constant, different points on the surface of the bottle are exposed to different beam energies. It has been found that the energy density window for the generation of the aforementioned mark is sufficiently narrow that the lens-shaped mark and its associated stressed region are only observed at those points at which the beam is effectively at rest. The result of this is that under polarized light, the stressed regions created by scanning the laser beam across the surface of the bottle show up as a series of dots. Thus by controlling the movement of the galvanometer mirrors 36 and 38, it is possible to scan the laser beam 12 across the surface of the bottle 14 in such a way as to "write" any desired symbol onto the bottle in a dot matrix format.

Figure 4:
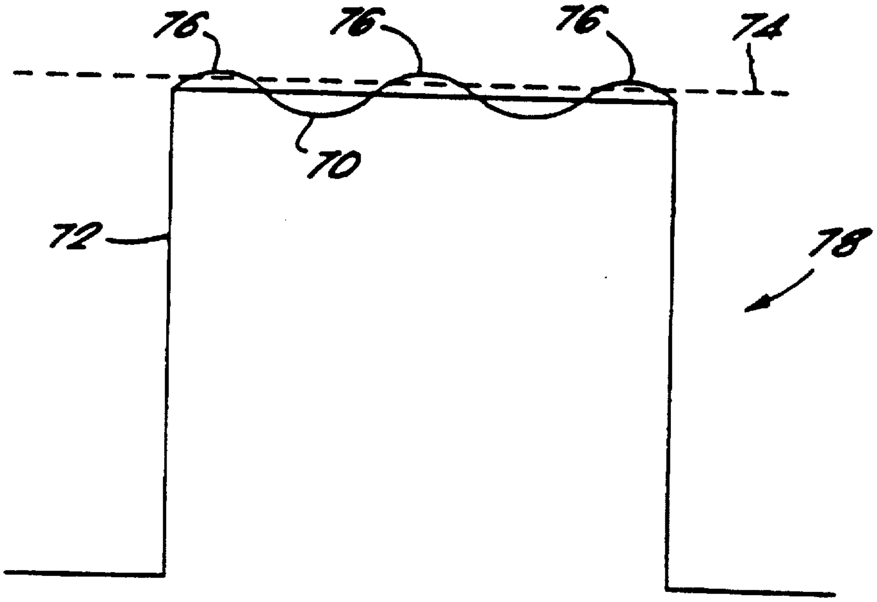
FIG. 4 is a schematic diagram of a laser power density profile capable of producing a series of marks in a dot-matrix format.

In an alternative embodiment, the same dot matrix format may be achieved by scanning the beam across the surface of the bottle at a constant speed whilst periodically varying its power density between two levels either side of the threshold for creating the lens-shaped mark and its associated stress pattern. This type of varying power density might, for example, be achieved by superimposing a sinusoidal ripple 70 on top of a square wave pulse of laser radiation 72, as shown schematically in FIG. 4. Assuming that the threshold for creating the aforementioned mark is at a power level represented by the dashed line 74 one might expect to see dot-like regions of stress within the glass spaced apart by a distance corresponding to that scanned by the laser beam between successive maxima 76 of the power density profile 78.

In both of the foregoing embodiments it is thought that the gradual increase in energy absorbed by the glass at points closer to that at which a mark is actually created provides the glass with a limited ability to anneal itself. This is to be contrasted with an arrangement in which the laser beam is pulsed to generate a series of marks at locations spaced an arbitrary distance apart. The self-annealing nature of the aforementioned embodiments is considered to provide a marked body whose strength is not compromised by the marking process.

Figure 5:
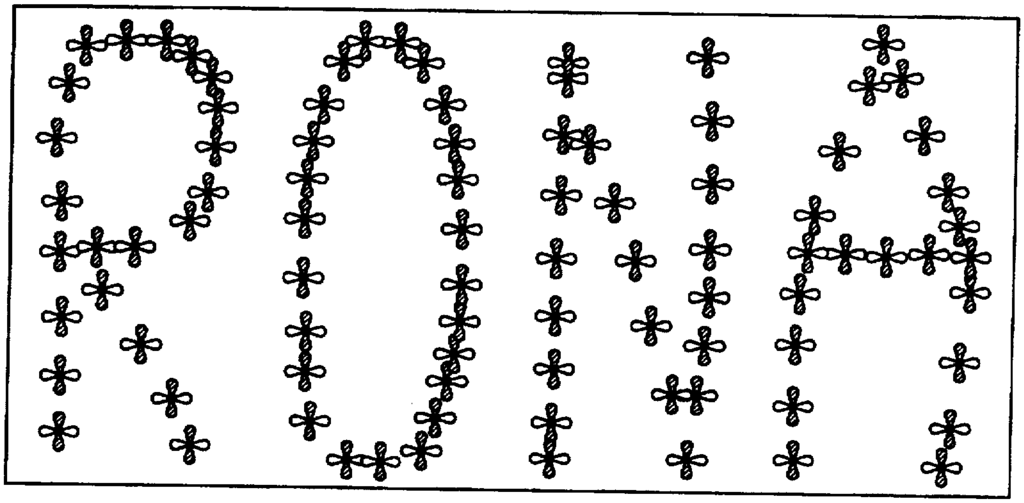
FIG. 5 is an example of a sub-surface mark produced by a method in accordance with the present invention.

The patterns of consecutive dots created by the methods described also result in a local reversal in the orientation of the stressed regions within the glass, and thus in the plane of polarization of any light caused to pass through them. This facilitates the detection of the marks and gives rise to a characteristic "cross-stitch" pattern, an example of which is shown in FIG. 5.

In a further embodiment, rather than creating a pattern of dots, the described apparatus may be used to create a mark comprising one or more continuous lines. To this end the beam of laser radiation 12 may be scanned across the surface of the body to be marked at a constant velocity, while at the same time the power density of the beam is maintained at a constant level just above the threshold for creating the lens-shaped mark and its associated stress pattern.

In yet another embodiment, rather than scanning the beam of laser radiation 12 across the surface of the body to be marked 14, the beam may be used to illuminate a mask. By placing the mask in front of the body to be marked and providing the mask with one or more apertures, selected portions of the incident beam may be caused to impinge upon the body and so produce a mark of a predetermined shape.

In order to observe the marks produced in accordance with any of the foregoing embodiments, the marked body may be placed between a pair of crossed linear polarizers and illuminated with a powerful collimated light beam. As a result the stressed regions are rendered visible as bright areas against a dark background.

Figure 6:
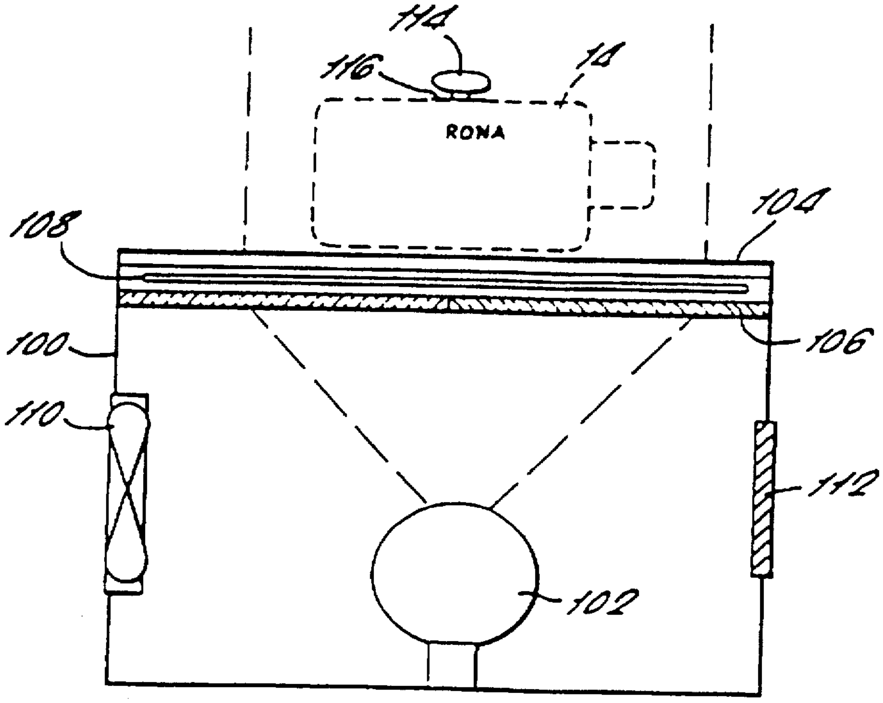
FIG. 6 is a schematic diagram of an apparatus for use in viewing the marks produced by a method in accordance with the present invention.

An example of an apparatus for use in viewing the marks produced in accordance with any of the foregoing embodiments is shown in FIG. 6 to comprise a housing 100 similar to that used as the base of an overhead projector in which there is disposed a lamp 102. The housing 100 is provided with an upper working surface of glass 104 and between this surface and lamp 102 there is provided a Fresnel lens 106 capable of providing basic beam collimation. Crossed linear polarizing filters 108 are inserted between the working surface 104 and the Fresnel lens 106, while in order to maintain the apparatus at a safe working temperature, the housing 100 is provided with a fan 110, of the type used in computer systems, as well as a louvred opening 112 for the passage of air. A dimmer switch may be provided to control the intensity of the lamp 102.

In order to observe the stressed regions within the marked body 14, the body is placed on top of the working surface 104 and viewed using a ×10 magnifyer 114 fitted with a suitable filter 116.

We claim:

1. A method of providing a body of material having thermal conductivity approximately equal to that of glass with a sub-surface mark, said method comprising directing at a surface of the body a beam of laser radiation to which the material is substantially opaque, so as to cause beam energy to be absorbed at the surface of the material in an amount sufficient to produce localised stresses within the body at a location spaced from said surface without any detectable change at said surface, the localised stresses thus produced being normally invisible to the naked eye but capable of being rendered visible under polarized light.

2. A method in accordance with claim 1, wherein the mark created by the localised stresses is representative of one or more numerals, letters or symbols or a combination thereof.

3. A method in accordance with claim 1, wherein the beam of laser radiation is concentrated so as to form an illuminated spot at a location on the surface of the body, the spot being moveable relative to the body to be marked thereby enabling the mark created by the localised stresses to be of a predetermined shape.

4. A method in accordance with claim 3, wherein the spot is moved relative to the body to be marked in such a way as to produce an elongate region of localised stresses that when rendered visible under polarized light has the appearance of a line.

5. A method in accordance with claim 3, wherein the spot is moved relative to the body to be marked in such a way as to produce a series of spaced apart regions of localised stresses that when rendered visible under polarized light has the appearance of a series of dots.

6. A method in accordance with claim 5, wherein the series of spaced apart regions of localised stresses are formed by moving the spot at a constant speed relative to the body to be marked and periodically varying the power density of the beam.

7. A method in accordance with claim 5, wherein the series of spaced apart regions of localised stresses are formed by maintaining the power density of the beam substantially constant and varying the time the spot is used to illuminate successive locations on the surface.

8. A method in accordance with claim 7, wherein the spot is moved relative to the body to be marked at a speed that varies periodically between zero and 3 m/s.

9. A method in accordance with claim 8, wherein the spot is moved relative to the body to be marked at an average speed in the range from 2 to 3 m/s.

10. A method in accordance with any of claim 5, wherein the beam energy absorbed at successive locations on the surface varies smoothly from one location to the next.

11. A method in accordance with any of claim 3, wherein the laser radiation has a power density at the spot of up to 10 kw/cm$^2$.

12. A method in accordance with claim 1, wherein the beam of laser radiation is caused to illuminate a mask placed in front of the body to be marked, the mask having one or more apertures thereby enabling the mark created by the localised stresses to be of a predetermined shape.

13. A method in accordance with claim 1, wherein the beam of laser radiation is generated by a $CO_2$ laser.

14. A method of providing a body of glass with a subsurface mark, comprising directing at a surface of the glass body a beam of laser radiation to which the glass is substantially opaque, so as to cause beam energy to be absorbed at the surface of the glass body in an amount sufficient to produce localised stresses within the glass body at a location spaced from said surface without any detectable change at said surface, the localised stresses thus produced being normally invisible to the naked eye but capable of being rendered visible under polarised light.

15. A method of providing a body of plastics material with a sub-surface mark, the plastics material having a thermal conductivity approximately equal to that of glass, said method comprising directing at a surface of the body a beam of laser radiation to which the plastics material is substantially opaque, so as to cause beam energy to be absorbed at the surface of the body in an amount sufficient to produce localised stresses within the body at a location spaced from said surface without any detectable change at said surface, the localised stresses thus produced being normally invisible to the naked eye but capable of being rendered visible under polarised light.

* * * * *